(12) United States Patent
Eckelberry et al.

(10) Patent No.: US 6,793,233 B2
(45) Date of Patent: Sep. 21, 2004

(54) TRAILER SLIDER PIN CONTROL SYSTEM

(75) Inventors: James Eckelberry, Canton, OH (US); John Ma, Rochester, MI (US); Frank A. Maly, Jr., Beverly Hills, MI (US); Joe Melekian, Rochester Hills, MI (US); Steven R. Miller, Clarkston, MI (US); Nancy L. Saxon, Oakland Township, MI (US); Rajesh J. Somnay, Troy, MI (US)

(73) Assignee: Meritor Heavy Technology, LLC, Troy, MI (US)

( * ) Notice: Subject to any disclaimer, the term of this patent is extended or adjusted under 35 U.S.C. 154(b) by 394 days.

(21) Appl. No.: 09/881,427

(22) Filed: Jun. 14, 2001

(65) Prior Publication Data

US 2002/0030341 A1 Mar. 14, 2002

Related U.S. Application Data

(60) Provisional application No. 60/211,774, filed on Jun. 15, 2000.

(51) Int. Cl.⁷ .............................................. B62D 53/00
(52) U.S. Cl. .................................. 280/407.1; 280/149.2
(58) Field of Search .............................. 280/407.1, 407, 280/405.1, 149.2; 180/272, 286, 209

(56) References Cited

U.S. PATENT DOCUMENTS

| | | | |
|---|---|---|---|
| 4,273,347 A | | 6/1981 | Hulse |
| 4,353,565 A | * | 10/1982 | Smith et al. ............. 280/149.2 |
| 4,960,091 A | * | 10/1990 | Aufmkolk ................ 123/198 D |
| 4,984,852 A | * | 1/1991 | McNinch, Jr. ............. 188/112 R |
| 5,137,296 A | * | 8/1992 | Forman ...................... 180/209 |
| 5,217,246 A | * | 6/1993 | Williams et al. ............. 180/41 |
| 5,314,201 A | | 5/1994 | Wessels |
| 5,465,990 A | | 11/1995 | Wessels |
| 5,617,072 A | * | 4/1997 | McNeal ...................... 280/441 |
| 5,620,195 A | | 4/1997 | Wessels |
| 5,716,071 A | | 2/1998 | Stanley et al. |
| 5,860,668 A | * | 1/1999 | Hull et al. ............... 280/149.2 |
| 6,279,933 B1 | * | 8/2001 | Ross et al. ............... 280/149.2 |
| 6,384,716 B1 | * | 5/2002 | Eckelberry ................ 180/209 |
| 6,421,593 B1 | * | 7/2002 | Kempen et al. ............ 180/271 |

* cited by examiner

*Primary Examiner*—Lesley D. Morris
*Assistant Examiner*—Paul Royal, Jr.
(74) *Attorney, Agent, or Firm*—Carlson, Gaskey & Olds

(57) ABSTRACT

A trailer slider pin control system is provided including a vehicle body and a rail supported along the body. The rails are moveable between a plurality of positions defined by a plurality of holes in the rail. A pin assembly is supported on the vehicle body and includes a pin moveable between unlocked and locked positions. The pin is disposed in the hole locking the rail to the vehicle body in the locked position. Conversely, the rail is free to move along the vehicle body in the unlock position. A sensor senses a location of a portion of the pin assembly, which corresponds to the unlock position. A vehicle speed control device, such as an engine, transmission, or braking system, is actuatable to limit the speed of the vehicle. A controller is connected to the sensor and the vehicle speed control device to actuate the vehicle speed control device to limit the speed of the vehicle in response to the sensors sensing the unlocked position. The controller may actuate an alarm to alert the vehicle operator that the pins are unlocked.

23 Claims, 3 Drawing Sheets

TRAILER SLIDER PIN CONTROL SYSTEM

This application claims priority to provisional application No. 60/211,774 filed on Jun. 15, 2000.

BACKGROUND OF THE INVENTION

This invention relates to a slider used on a commercial trailer, and more particularly, the invention relates to a pin control system for the trailer slider.

A trailer slider system is used to move the trailer cargo area relative to the vehicle body to better distribute the weight of the cargo on the trailer suspension. Typically, a pair of spaced apart rails are rigidity attached to or an integral part of a trailer cargo area, which are slidable along the vehicle body. The rails include a plurality of holes arranged along the length of the rails. A locking pin assembly that includes pins, which are mounted to the vehicle body, are moved into the holes to lock the vehicle body and cargo area securely together for vehicle travel. The pins are moved out of engagement with the rails to permit adjustment of a cargo area relative to the vehicle body.

Occasionally the pins do not fully lock the rails to the vehicle body. To this end, the trailer body includes a rear stop bar that prevents the cargo box from sliding off the vehicle body. It may be necessary for the operator to move the trailer under low speeds to better align the pins and rails so that the pins may fully lock the rails to the vehicle body. However, under speeds of less than 20 MPH the collision between the rails and stop bar may cause severe structural damage to the trailer. Under higher speeds the cargo box may even detach from the vehicle body. Therefore, what is needed is a pin control system that prevents damage to the trailer while permitting the operator to move the trailer to align the pins and holes, if necessary.

SUMMARY OF THE INVENTION AND ADVANTAGES

The present invention provides a trailer slider pin control system including a vehicle body and a rail supported along the body. The rails are moveable between a plurality of positions defined by a plurality of holes in the rail. A pin assembly is supported on the vehicle body and includes a pin moveable between unlocked and locked positions. The pin is disposed in the hole locking the rail to the vehicle body in the locked position. Conversely, the rail is free to move along the vehicle body in the unlock position. A sensor senses a location of a portion of the pin assembly, which corresponds to the unlock position. A vehicle speed control device, such as an engine, transmission, or braking system, is actuatable to limit the speed of the vehicle for preventing damage to the trailer. A controller is connected to the sensor and the vehicle speed control device to actuate the vehicle speed control device to limit the speed of the vehicle in response to the sensors sensing the unlocked position.

Accordingly, the above invention provides a pin control system that prevents damages to the trailer while permitting the operator to move the trailer to align the pins and holes, if necessary.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
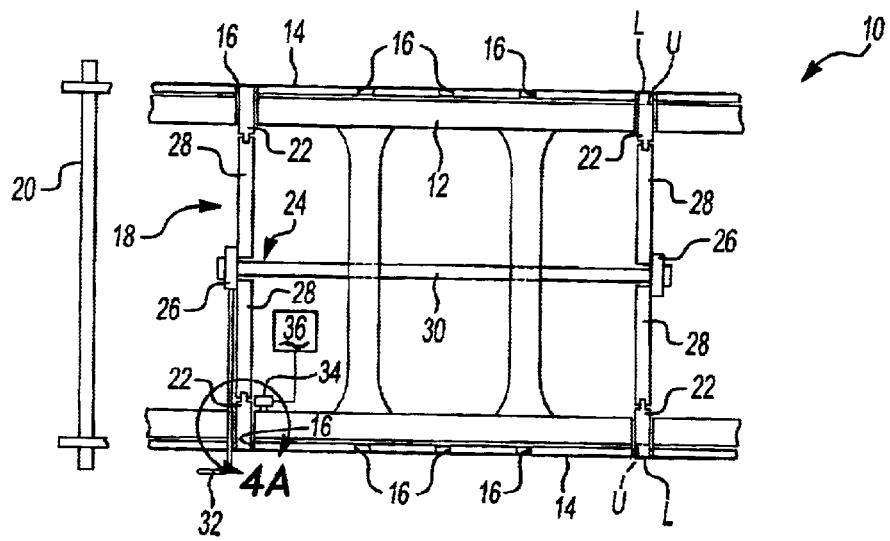
FIG. 1 is a top elevational view of a trailer slider system.

A trailer slider system 10 is shown in FIG. 1. The slider 10 includes a vehicle body 12 supporting a cargo box (not shown) secured to spaced apart rails 14. Rails 14 are slidable along the vehicle body 12 to better distribute the weight of the cargo box on the trailer suspension. The rails 14 include holes 16 defining a plurality of trailer slider positions. A locking pin assembly 18 secures the rails 14 to the vehicle body 12 in one of the slider positions by inserting pins 22 into the hole 16 of the rails 14. A stop bar 20 secured to the body rails on the cargo area 14 prevents the rails 14 and attached cargo box from sliding off the vehicle body 12. However, even under relatively low speeds a collision between the vehicle body 12 and stop bar 20 may cause severe structural damage to the trailer.

One embodiment of the locking pin assembly 18 may include a mechanical linkage 24 for manually actuating the pins 22 between a locked position L in which the pins 22 are disposed within the holes 16 and a unlocked position U in which the pins 22 are retracted from the hole 16. Linkage 24 includes connecting bars 28 connecting the pins 22 to a bell cranks 26. A manual actuating handle 32 is connected to the bell crank 26 to move the pins 22 to an unlocked position when the handle 32 is pulled. The handle is sprung biased to move the pins to the locked position. A torque tube 30 extends between the bell cranks 26 to transmit the rotational movement from the bell crank 26 connected to the handle 32 to the other bell crank 26. Although a manual pin locking system is shown, it is to be understood that automated locking pins systems may also be used.

It is critical that the pins 22 lock the rails 14 to the vehicle body 12 during normal vehicle travel. Occasionally it is difficult to actuate the locking pin assembly 18 to insert the pins 22 into the hole 16 due to corrosion, dirt, and misalignment of the pins 22 relative to the holes 16. It may be necessary for the vehicle operator to drive the vehicle at low speeds to shift the rails 14 and cargo box relative to the vehicle body 12 to align the pins 22 and holes 16. At times the pins 22 may appear to be fully engaged with the rail 14 and the operator may begin normal vehicle travel making the rails 14 susceptible to disengagement with the pins 22. To this end, the present invention incorporates a pin control system for detecting pin position and limiting vehicle speed to ensure that damage to the trailer does not occur.

Figure 2:
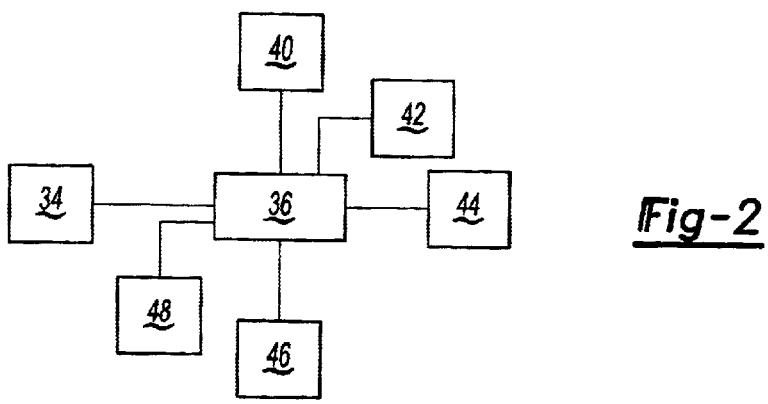
FIG. 2 is a schematic view of the pin control system of the present invention.

One pin control system, shown in FIG. 1, includes a sensor 34 for detecting a position of the pin 22. The sensor 34 is in connection with a controller 36 that is connected to various vehicle speed control devices, as shown in FIG. 2. When the sensor 34 detects that the pin 22 is in an unlocked position, the controller 36 may actuate an antilock braking system 40, a parking brake 42, a transmission 44, and/or an engine 46 to limit the vehicle speed to a desired speed, preferably under 5 MPH. The ABS 40 may apply the brakes such that the operator is unable to drive the vehicle past the desired speed or pulse the brakes in an effort to step the vehicle back rearward in an effort to get the pins to engage. Alternatively, the parking brake 42 may be applied to prevent the operator from moving the vehicle prior to full engagement of the pins 22 with the rails 14. The transmission 44 may be prevented from shifting to a gear other than the low gear so that a speed above the desired speed cannot be achieved. Similarly, the speed of the engine 46 may be governed to prevent a vehicle speed in excess of the desired speed.

The controller 36 may also actuate an alarm 48 to alert the operator that the pins 22 are unlocked. The alarm 48 may include an audible and/or visual signal indicating that the pins 22 are unlocked.

Figure 3:
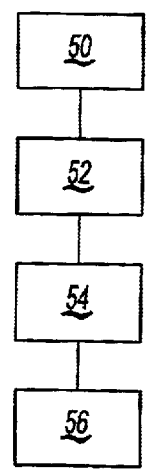
FIG. 3 is a flow chart illustrating a method of utilizing the present invention pin control system.

In operation, the pin control system detects a slider pin position in any suitable location along the locking pin assembly 18, as indicated at 50 in FIG. 3. A vehicle device such as the ABS 40, parking brake 42, transmission 44, and/or the engine 46 may be actuated by the controller 36 in response to the sensor 34 sensing an unlock position, as generally indicated at 52. The vehicle speed is limited to a desired speed, which is preferably greater than zero, as indicated at 54. Preferably, the vehicle operator is alerted to the pins being in the unlocked position so that the operator may correct the situation, as indicated at 56.

Figure 4A:
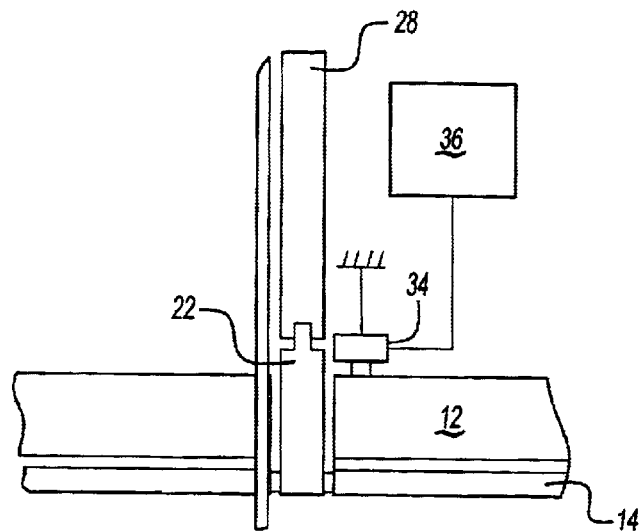
FIG. 4A an enlarge view is a first embodiment of the pin control system shown in FIG. 1.
Figure 4B:
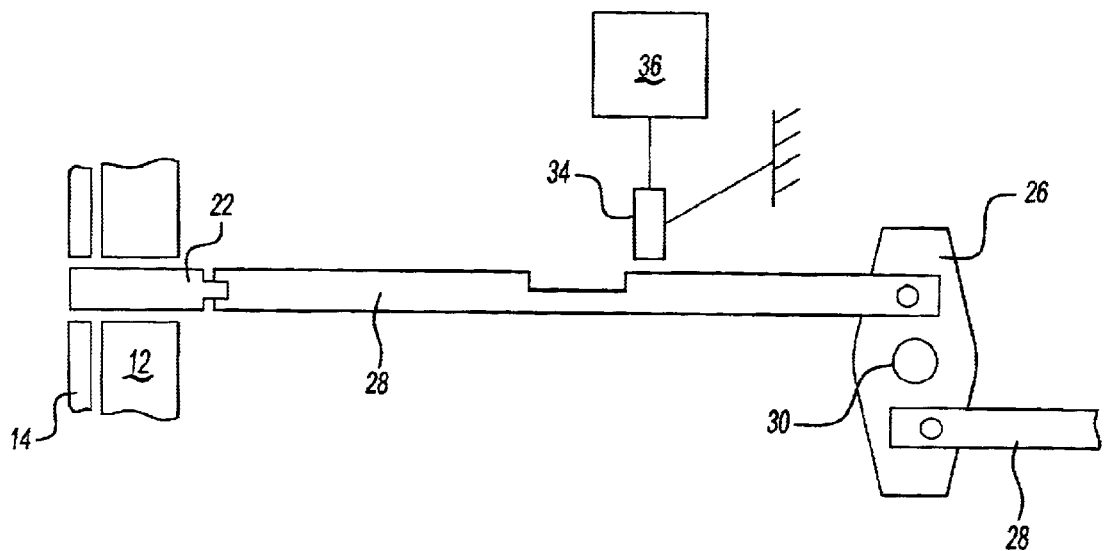
FIG. 4B is a second embodiment of a pin control system.
Figure 4C:
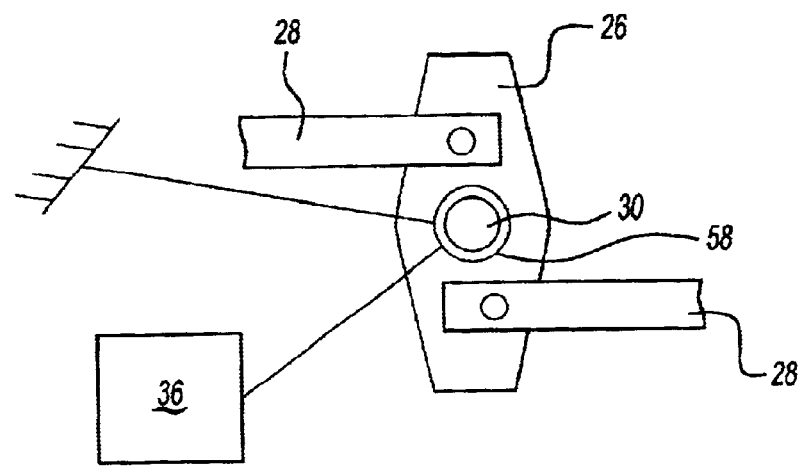
FIG. 4C is a third embodiment of a pin control system.
Figure 4D:
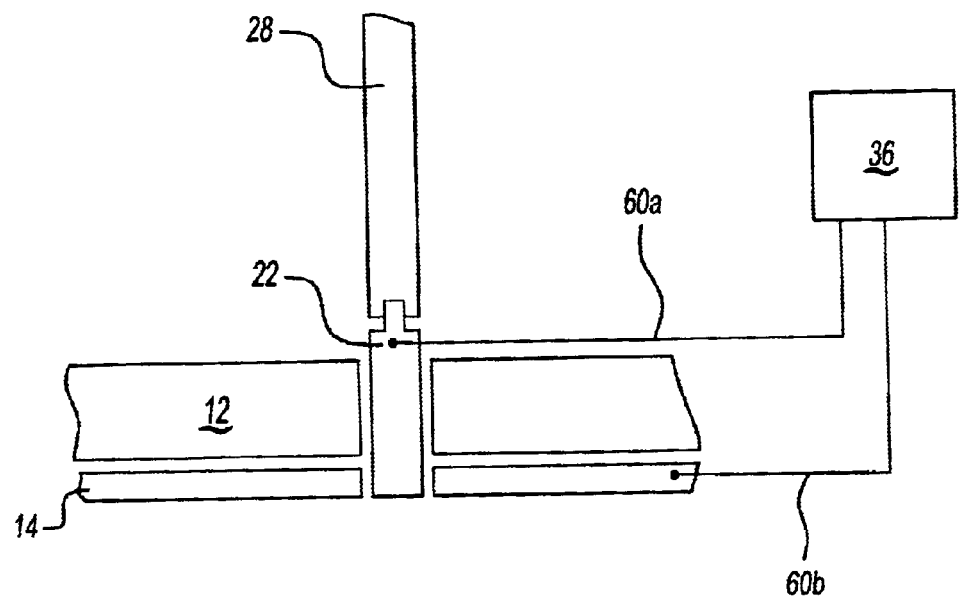
FIG. 4D is a fourth embodiment of the pin control system.

Several embodiments of the present invention pin control system are shown in FIGS. 4A–4D. Although the pin control system is shown relative to a manual locking pin assembly, it is to be understood that the invention may be used with other locking pin systems. The pin control system may include a proximity sensor 34 near the pin 22 for directly sensing the position of the pin 22, as shown in FIG. 4A. The pin control system may alternatively include a proximity sensor 34 adjacent to the connecting bar 28 for sensing the position of the pin 22, which is related to the position of the connecting bar 28, as is shown in FIG. 4B. As another alternative, a rotational variable displacement transducer 58 may be connected to the torque tube 20 sensing the rotational position of the torque tube 30, which is related to the position of the pin 22, as shown in FIG. 4C. Referring to FIG. 4D, an unlocked position of the pin 22 may be sensed when a circuit is broken. The circuit may be formed by wire 60*a* and 60*b* connected to the rail 14 and pin 22, which closes a circuit when the pin 22 is received in the rail 14. The circuit is broken when the pin 22 is in an unlocked position. A coating may be used on the pin 22 to minimize the corrosive effects caused by the electrical current in the closed circuit.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of controlling a vehicle with a trailer slider comprising the steps of:
    a) detecting a slider pin position;
    b) actuating a vehicle device in response to the slider pin position; and
    c) limiting the vehicle speed to a desired speed greater than zero with the vehicle device.

2. The method according to claim 1, further including the step of:
    d) alerting the vehicle operator of the slider pin position.

3. The method according to claim 1, wherein step a) includes sensing a position of a slider pin.

4. The method according to claim 1, wherein step a) includes sensing a position of a linkage connected to a slider pin.

5. The method according to claim 4, wherein step a) includes sensing a rotational position of a torque tube.

6. The method according to claim 4, wherein step a) includes sensing a position of a manual actuating handle.

7. The method according to claim 1, wherein step b) includes actuating an anti-lock braking system.

8. The method according to claim 1, wherein step b) includes governing engine speed.

9. The method according to claim 1, wherein step b) includes preventing a transmission gear shift.

10. The method according to claim 1, wherein step c) includes limiting the vehicle speed to a speed below approximately 5 miles per hour.

11. The method according to claim 1, wherein step a) includes detecting an open circuit in the trailer slider.

12. A trailer slider pin control system comprising:
    a vehicle body;
    a rail supported along said body movable between a plurality of positions defined by a plurality of holes in said rail;
    a pin assembly supported on said vehicle body including a pin movable between unlocked and locked positions with said pin disposed in said hole locking said rail to said vehicle body in said locked position and said rail free to move along said vehicle body in said unlocked position;
    a sensor sensing a location of a portion of said pin assembly corresponding to said unlocked position;
    a vehicle speed control device actuatable to limit a speed of said vehicle; and
    a controller connected to said sensor and said vehicle speed control device, said controller actuating said vehicle speed control device to limit said speed in response to said sensor sensing said unlocked position.

13. The system according to claim 12, wherein said pin includes said pin assembly portion, and said sensor is a proximity sensor.

14. The system according to claim 12, wherein said pin assembly includes a linkage for moving said pin between said locked and unlocked positions with said linkage including said pin assembly portion, and said sensor is a proximity sensor.

15. The system according to claim 12, wherein said pin assembly includes a linkage having a manual actuating handle for moving said pin between said locked and unlocked positions with said handle including said pin assembly portion, and said sensor is a limit switch coacting with said handle.

16. The system according to claim 12, wherein said pin assembly includes a linkage having a torque tube for moving said pin between said locked and unlocked positions with said torque tube including said pin assembly portion, and said sensor is a rotational variable displacement transducer coacting with said torque tube.

17. The system according to claim 12, wherein said vehicle speed control device is a parking brake maintained in an actuated position by said controller.

18. The system according to claim 12, wherein said vehicle speed control device is an engine with an engine speed governed by said controller.

19. The system according to claim 12, wherein said vehicle speed control device is transmission maintained in a low gear by said controller.

20. The system according to claim 12, wherein said vehicle speed control device is an anti-lock braking system applied by said controller.

21. The system according to claim 12, wherein said vehicle speed is approximately less than 5 miles per hour.

22. The system according to claim 12, wherein said pin and said rail forms a closed circuit in said locked position and an open circuit in said unlocked position, with said sensor sensing said open circuit.

23. The system according to claim 12, further including an alarm connected to said controller with said alarm actuated by said controller in response to said sensor sensing said unlocked position.

* * * * *